W. M. RICHARDS.
REFRACTOMETER.
APPLICATION FILED MAY 27, 1912.

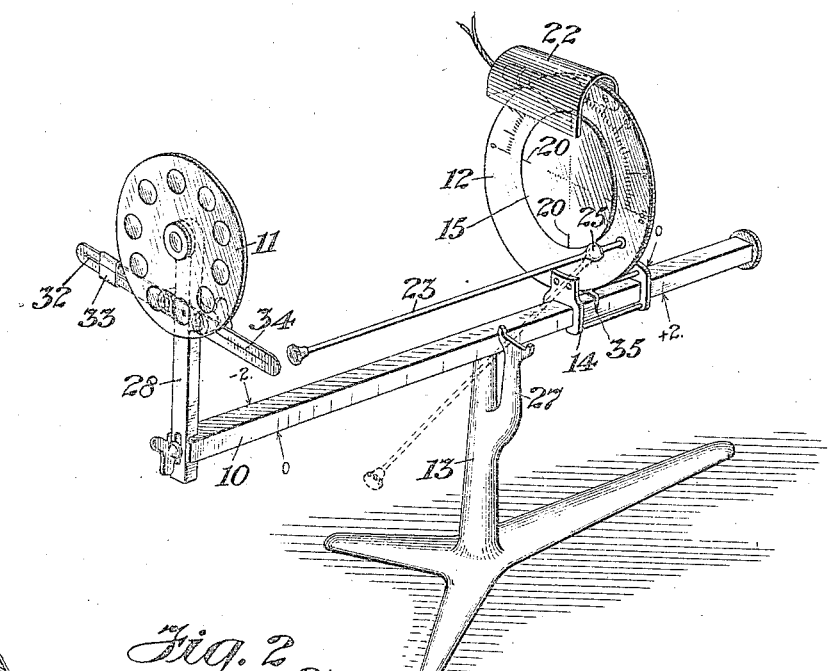

1,232,842.

Patented July 10, 1917.
2 SHEETS—SHEET 2.

WITNESSES
Chas. F. Clagett
E. W. Fairbanks

INVENTOR
William M. Richards
BY
G. C. Dean ATTORNEY

UNITED STATES PATENT OFFICE.

WILLIAM MARTIN RICHARDS, OF NEW YORK, N. Y.

REFRACTOMETER.

1,232,842.  Specification of Letters Patent.  Patented July 10, 1917.

Application filed May 27, 1912. Serial No. 699,892.

*To all whom it may concern:*

Be it known that I, WILLIAM MARTIN RICHARDS, a citizen of the United States, and resident of New York city, in the county of New York and State of New York, have invented certain new and useful Improvements in Refractometers, of which the following is a specification.

This invention relates to certain improvements in optical instruments used for determining indices of refraction and particularly for determining ametropia. The object of my invention is to enable any person to determine his or her own entire ametropia even though the person is not versed in the knowledge of the eye or acquainted with the rules or laws governing light refraction.

The data which it is customary to obtain in fitting a patient with glasses are the amount of near or far sightedness the axis of astigmatism and the amount of the astigmatism. I provide a simple and easily operated instrument in which all of this data may be obtained by the relative adjustment of a screen and a series of lenses. The screen constitutes one of the important features of my invention and bears a series of points or dots. These dots may be viewed through convex or concave lenses and at varying distances, and are of such size that in case the person has astigmatism, the separate dots or points will appear as parallel dashes inclined in one direction when viewed under one condition, that is, at one distance and through one lense and will appear as dashes inclined at 90 degrees to the first angle when viewed under a second condition, that is, at a different distance or through a different lens or both depending upon the amount of the astigmatism. I preferably provide two rows of these dots or points at right angles to each other and so mount the screen that it may be rotated or oscillated a sufficient distance to bring the separate inclined dashes of one row into alinement with each other so that they will appear as a single straight line, when viewed under the first condition. The axis of astigmatism may be determined by the extent of rotation necessary to secure this effect and then with the screen in this angular position, it may be moved to such a second position that the dashes of the other row will appear as a straight line. Thus if there is no astigmatism it is merely necessary to note the lens and distance at which the dots or points on the screen may be seen the clearest. If there be astigmatism, it is merely necessary to note the angle of rotation necessary to bring the separate dashes of one row into alinement with each other and the distance between the position at which the dashes of one row appear as a line and that at which the dashes of the other row appear as a line.

Preferably, the screen is mounted adjacent to a curved scale so that the extent of rotation may be easily noted and the means for effecting the rotation preferably comprises a pinion having a shaft formed of two sections connected together by a universal joint. The shaft extends forwardly toward the eye piece so as to be within easy reach and serves also as a handle for sliding a screen back and forth along a graduated support. The universal joint permits the farther end of the shaft to be swung to one side as the screen approaches the eye piece. In order that the axis of astigmatism may be accurately determined, it is essential that the head be held level, in other words, that the eyes be in parallelism with the horizontal axis of the screen. To insure this result, I provide suitable sight openings adjacent to the eye piece and movable to secure the proper adjustment of the instrument.

Various changes may be made in the details of construction and arrangement of parts within the spirit of my invention and without departing from the scope of the appended claims and therefore I desire the specific embodiment of my invention which is shown in the accompanying drawings to be considered in an illustrative rather than limiting sense. In these drawings Figure 1 is a perspective view of an instrument constructed in accordance with my invention;

Fig. 2 is a transverse section showing the screen and screen carrier in front elevation;

Fig. 3 is a central longitudinal section through the screen;

Figure 4:
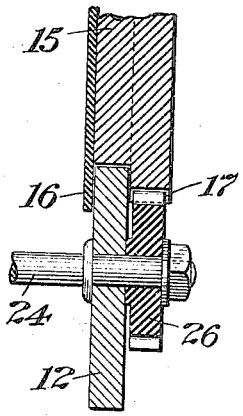
Fig. 4 is a sectional detail on the line 4—4 of Fig. 2.
Figure 5:
Fig. 5 is a side elevation of one side of the supporting scale and showing the readings for far sightedness.
Figure 6:
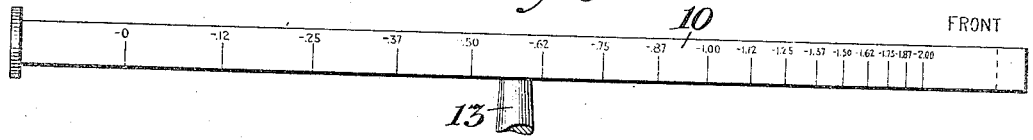
Fig. 6 is a view similar to Fig. 5 but showing the reverse side of the support with the readings for nearsightedness; and, Fig. 7 is a face view of the lens carrier.

In the preferred embodiment of my invention there is provided a supporting bar 10 having a lens carrier 11 and a screen carrier 12 relatively adjustable thereon. This supporting bar may be mounted upon a pedestal 13 of any suitable character and may be of any suitable length but is preferably of a length depending upon the difference in focal length between successive lenses on a lens carrier. The screen carrier 12 includes a slide 14 engaging with the supporting bar 10 and adapted to move past the pedestal 13 without interference therewith. A rotatable screen 15 may be retained in position on the screen carrier in any suitable manner but a very simple and convenient arrangement is to provide the screen carrier with a central opening and the screen with a face plate 16 larger than said opening and a rear peripheral flange 17 having teeth to constitute the same gear wheel.

The screen has two broken lines 18 and 19 thereon at right angles to each other and extending to the center of the screen. These lines preferably cross each other and are preferably each formed of a series of dots but may be very short dashes or perforations through the screen. The screen is normally retained in such a position that one row of dots will extend vertically while the other row extends horizontally but the screen may be rotated to bring the rows at any desired angle dependent upon the angle of astigmatism. For indicating this angle the screen is provided with a scale subdivided into degrees from zero to 180 and the screen itself may have indicating marks 20 by means of which the screen may be properly positioned. The zero and the 180 degree marks on the scale are in substantially horizontal alinement and serve to insure the proper position of the eyes as will be hereinafter pointed out. The lines on the screen are preferably in the form of rows or dots as previously pointed out and any suitable illuminating means such for instance as an electric light 21 protected from view by a shade 22 may be employed for illuminating the surface of the screen. If the lines be in the form of perforations in the screen the light may be bent to the rear side of the screen.

For rotating the screen I provide a shaft having two sections 23 and 24 connected together by a universal joint 25. The section 24 is supported in the screen carrier 12 and has a pinion 25 meshing with the peripheral teeth on the rear of the screen. The other section 23 projects forwardly so as to be within easy reach of the patient or doctor and serves not only as a handle for sliding the screen back and forth along the supporting rod 10 but also may be turned to rotate the screen. When not in use the section 23 may rest upon a suitable bracket 27 on the pedestal. The universal joint permits the front end of the shaft to be swung to one side as the screen approaches the face of the patient.

At the front end of the supporting rod 10 is a vertical standard 28 slightly adjustable vertically, and bearing at its upper end the lens carrier 11. This lens carrier is mounted to rotate in a vertical plane parallel to the screen and carries a series of concave and convex lenses of graduated power. There is one blank space 29 shown in Fig. 7 as being opposite a peep hole 30 in the standard 28. The first lens at one side of this space 29 bears a lens marked plus zero which is a plus 3 dioptric lens. The next successive lens is marked plus 2 and is of plus 5 dioptrics. On the opposite side of the first lens is marked minus zero and is a plus 1 dioptric lens. The next is marked minus 2 and is of minus 1 dioptrics. The next is marked minus 4 and is of minus 3 dioptrics. The two series continue in opposite directions until they meet but there are preferably more of the minus lenses than of the plus. Anyone of the lenses may be brought opposite the peep hole by a simple rotation of the lens carrier.

Figure 7:
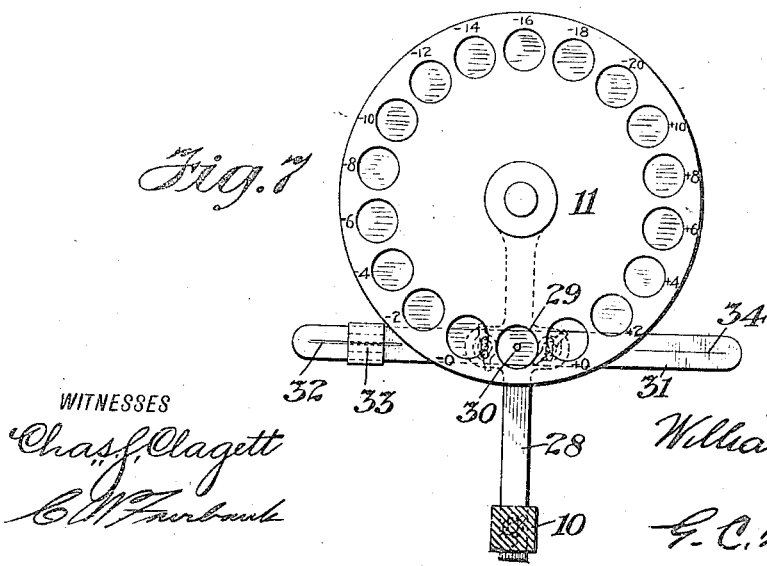

Adjacent to the lens carrier is a transversely extending bar 31 held to the standard 28 by suitable thumb screws shown in dotted lines in Fig. 7 and permitting of a slight vertical tilting of the opposite ends of the bar. At one end of the bar is a slot or sight opening 32 and a slide 33 having a horizontal line across its center. At the opposite end of the bar there is a similar line 34. The instrument should be so adjusted that the lines at the opposite ends of the bar are in parallelism with the zero and 180 degree lines on the scale carrier and with the side indicating marks 20 on the screen after the instrument has been properly adjusted by sighting through the peep hole and the slot, the slide 33 may be moved out so that the person in looking through the peep hole 30 with one eye will look directly at one of the lines with the other.

The supporting bar 10 either carries or constitutes a scale and is graduated on one side from plus zero adjacent to the lens carrier to plus 2 at the opposite end of the bar and on the other side from minus 2 adjacent the lens carrier to minus zero at the outer end of the bar. The slide 14 of the screen carrier may have oppositely disposed pointers 35 on the sides of the bar to facilitate the making of accurate readings. As a one dioptric lens focuses at one meter and a two dioptric lens at one-half of a meter and a three dioptric lens at one-third of a meter it is evident that the graduations on the scale bar are not at equal distances apart but are spaced according to the focal length indicated. As the scale allows for a range of 2 dioptrics and the difference between successive lenses on the lens carrier is also 2 dioptrics it is evident that by selecting the proper lens and adjusting the screen to the proper position an eye of any degree of far sightedness or near sightedness may be properly focused on the lines on the screen. With the screen at the plus zero indication and with the plus 3 dioptrics lens which is marked plus zero, over the peep hole, that is with both readings at zero, a normal eye should see the dots clearly. In obtaining the proper strength of glass to be used if the person is far sighted the different plus lenses in succession are tested with the screen at various points until the proper adjustment is secured. The strength of glass required for that eye is obtained by adding the readings opposite the lens to the reading on the plus side of the scale. If the person is near sighted it will be necessary to use minus lenses and the readings will be made on the minus side of the scale. If there is no astigmatism the lines will appear as a series of dots but if there is astigmatism the dots will appear as inclined dashes which may be converted into a straight vertical line and a series of parallel vertical dashes by the rotation of the screen. This straight line effect results from the shape, size and spacing of a plurality of the dots arranged at distances determined by the elongating distortion occurring in the axis of maximum distortion of an astigmatic human eye, and the drawings indicate a target in which these factors are satisfactorily predetermined. The angle of rotation necessary gives the axis of astigmatism. The amount of the astigmatism is then obtained by moving the screen to such a position that the other row of dots appears as a horizontal line and the first mentioned row appears as a series of parallel horizontal dashes. The several readings thus obtained give all of the data necessary in fitting the patient with the proper lens for eye glasses. It is of course understood that before making the test the eye is suitably treated to temporarily destroy its power of accommodation. Any suitable compound may be employed for this purpose but one which I prefer to use contains two per cent. homatropine and one-half per cent. of cocaine.

Various changes may be made in the construction and arrangement of the parts shown without departing from the spirit of my invention. For instance instead of employing the particular lenses above referred to I may employ a smaller number with a greater difference between successive lenses. In this case it is of course necessary to provide for a greater range of adjustment along the supporting bar 10. The desired effect might be obtained by employing only one row of points or dots. With such a marking on the screen the amount of near sightedness or far sightedness and the axis of astigmatism would be determined in exactly the same manner as above indicated but before determining the amount of astigmatism it would be desirable to rotate the screen through exactly 90 degrees so that a line effect would be obtained in the second position instead of merely a series of parallel horizontal dashes.

Having thus described my invention what I claim as new and desire to secure by Letters Patent is:

1. An instrument of the class described, including a scale, a rotatable screen adjacent thereto, an eye piece and means adjacent to said eye piece for insuring the holding of the eyes in horizontal alinement.

2. An instrument of the class described including a curved scale having diametrically opposed indications in horizontal alinement, a rotatable screen adjacent thereto, an eye piece and means for insuring the holding of the eyes in parallelism with said indications.

3. An instrument of the class described including a screen having opposed indications substantially in horizontal alinement and separate sight openings for the two eyes, one of said openings being vertically adjustable to bring said openings into parallelism with said indications.

4. An instrument of the class described including a member having sight openings for the two eyes, and a screen carrying member having opposed indications substantially in horizontal alinement, one of said members being adjustable to bring said openings and said indications into parallelism.

5. An instrument of the class described, having a standard, a scale supported intermediate of its ends on said standard, a rotatable lens support carried by said scale at one end, a slide movable along said scale and carrying a disk support, a rotatable disk carried by said support, a pinion also carried by said support and engaging with said disk for rotating the latter, and a shaft connected to said pinion and extending toward said lens support and including a universal joint, said shaft serving for the rotating of said disk and for the bodily movement of the latter along said scale.

Signed at New York city, in the county of New York and State of New York this 25th day of May, A. D. 1912.

WILLIAM MARTIN RICHARDS.

Witnesses:
E. F. CAREY,
JOSEPH FOGELMAN.